April 30, 1963    R. F. PITMAN    3,087,581
FIBERGLAS STRUCTURAL MEMBER AND METHOD OF MAKING SAME
Filed March 7, 1960    3 Sheets-Sheet 1

INVENTOR.
Raymond F. Pitman
BY
Hovey, Schmidt, Johnson & Hovey
ATTORNEYS.

April 30, 1963 R. F. PITMAN 3,087,581
FIBERGLAS STRUCTURAL MEMBER AND METHOD OF MAKING SAME
Filed March 7, 1960 3 Sheets-Sheet 2
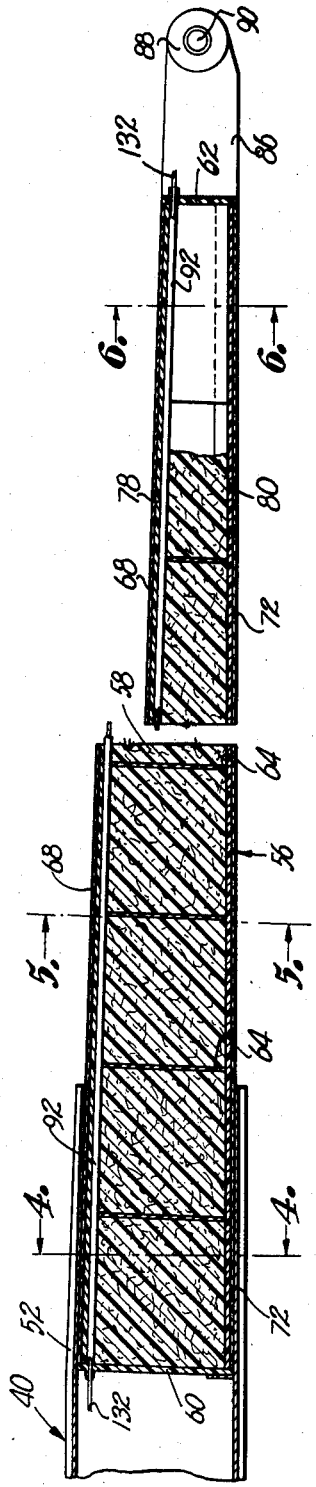
INVENTOR.
Raymond F. Pitman
BY
ATTORNEYS.

April 30, 1963 R. F. PITMAN 3,087,581
FIBERGLAS STRUCTURAL MEMBER AND METHOD OF MAKING SAME
Filed March 7, 1960 3 Sheets-Sheet 3

INVENTOR.
Raymond F. Pitman
BY
Horey, Schmidt, Johnson & Horey
ATTORNEYS.

United States Patent Office 3,087,581
Patented Apr. 30, 1963

3,087,581
FIBERGLAS STRUCTURAL MEMBER AND
METHOD OF MAKING SAME
Raymond F. Pitman, Prairie Village, Kans., assignor to Pitman Manufacturing Company, Grandview, Mo., a corporation of Missouri
Filed Mar. 7, 1960, Ser. No. 12,931
3 Claims. (Cl. 182—2)

This invention relates to a novel structural member as well as to an improved method of producing the same, with the member being particularly adapted for utilization as the upper boom element of an aerial platform truck or the like.

Since initial introduction of the aerial platform truck, the acceptance and utilization of vehicles of this type has grown steadily, with the vehicles being put to various uses where it is necessary that a workman perform certain operations at a considerable height above the ground. The aerial platform trucks conventionally include a table mounted on the frame of the vehicle for rotation on a substantially vertical axis, with the table in turn carrying a pair of horizontally swingable booms each movable independently of the other to permit selective change in the elevation of the outer extremity of the normally upper boom. A basket unit swingably mounted on the outer end of the upper boom is adapted to carry one or more workmen, with parallel bar mechanism being provided for maintaining the basket in a horizontal position regardless of the elevation thereof during swinging of the booms.

Although aerial platform trucks have enjoyed widespread commerical success, problems have been encountered when the trucks are utilized by utility companies in work on electrical energy transmission facilities. Since the operator basket as well as the booms carrying the basket on the frame of the vehicle, were constructed of metal, a serious electrocution hazard was presented, particularly when the workmen were required to perform tasks on and around high voltage transmission lines. The metallic booms and basket unit were required in order to provide the necessary structure strength, inasmuch as the workmen had to be elevated to considerable heights such as 50 or 60 feet off the ground and frequently at substantially acute angles with the ground, thereby placing a relatively high load on the boom members forming a part of the truck. Additionally, it was necessary to maintain the cost of the aerial platform truck substantially at a level comparable to units not adapted to be used by utility companies for work on electrical energy transmission equipment.

It is therefore the primary object of the present invention to provide an improved structure member for utilization as at least one of the boom elements of an aerial platform truck, and which has electrical insulating characteristics to preclude grounding of the operator basket to the vehicle supporting the swingable booms.

It is another important object of the invention to provide a structural member of electrical insulating properties which has strength characteristics approximating those of a steel boom element, notwithstanding the fact that the nonconductive structural member is of generally equal dimensions to those of an equivalent metal element.

A still further important object of the invention is to provide a structural member having insulating properties which includes an elongated, tubular element of synthetic resin foam in the element serving to additionally reinforce the latter whereby the structural member has tensile strength specifications comparable to a steel boom element of similar dimensions.

Also an important object of the invention is to provide a structural member of synthetic resin material which is constructed in a manner so that the same may be molded of proper configuration, thereby permitting careful control of the physical properties of the final product as well as maintaining the cost of the unit at an economically feasible level. In this respect, it is a further important object of the invention to provide a novel process for producing the insulating structural member wherein the outer, tubular element is formed of an initial channel-shaped component which is then filled with synthetic resin foam, whereupon a final part is secured to the channel component in closing relationship to the longitudinally extending opening therein to present the final unit.

An equally important object of the invention is to provide a structural member as described wherein glass fiber mats are incorporated into the synthetic resin material forming the outer, tubular element, to thereby reinforce the latter and materially increase the structural strength of the unit. An object also relates to curing the synthetic resin foam in the tubular element in a manner so that the foam adheres firmly to the inner surfaces of the element, thereby increasing the strength of the completed member.

A still further important object of the invention is to provide an aerial platform truck wherein the upper boom and operator basket are constructed of synthetic resin material to thereby preclude grounding of the basket during utilization of the truck.

An additional important object of the invention is to provide an improved aerial truck having an operator basket and an upper boom of synthetic resin material wherein is provided novel control means on the basket and the boom permitting the operator to change the position of the basket as desired, and without grounding himself during manipulation of the controls.

Other important objects and details of construction of the present invention will become obvious or be described in greater detail as the following specification progresses.

In the drawings:

FIG. 3 is a fragmentary, vertical, cross-sectional view of the upper boom element and particularly illustrating the structural member constructed of synthetic resin material;

Figure 7:
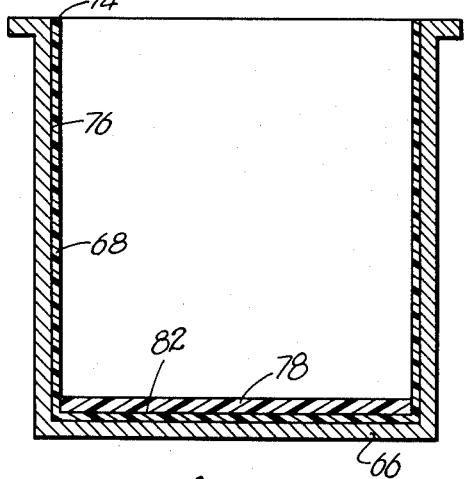
Figure 8:
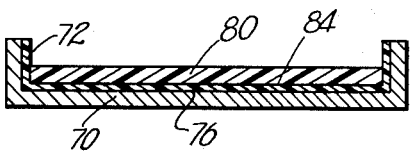
Figure 9:
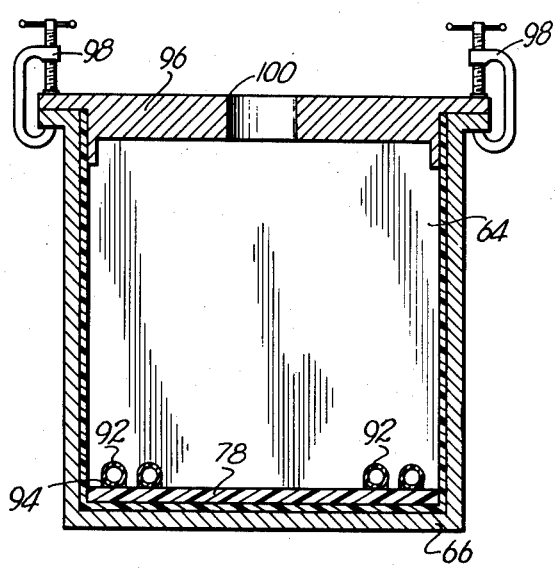
Figure 10:
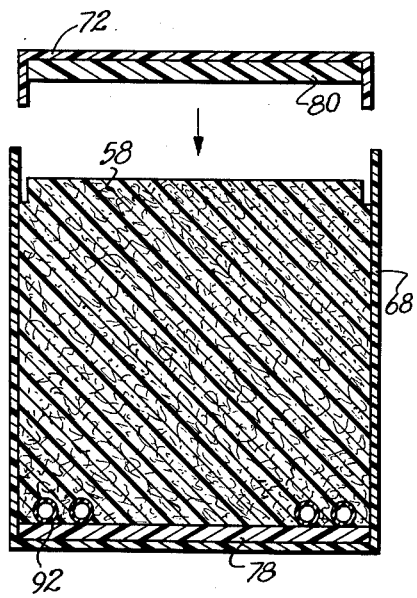

FIGS. 4, 5 and 6 are vertical cross-sectional views taken on the lines 4—4, 5—5 and 6—6 respectively of FIG. 3;

FIG. 7 is a schematic, vertical cross-sectional view of a channel-shaped mold employed in producing the structural member shown in FIG. 3 and illustrating certain layers of the synthetic resin material;

FIG. 8 is a schematic, vertical cross-sectional view through a mold utilized in producing the cap part for closing the longitudinally extending opening in the initially U-shaped component of the structural member;

FIG. 9 is a schematic representation in vertical cross-section illustrating the closure for disposition on the mold illustrated in FIG. 7 to permit synthetic resin foam to be introduced into the channel-shaped component of the tubular element of the structural member; and FIG. 10 is a schematic showing in vertical section of the final components of the structural member immediately prior to connection of the same to present the insulating structural unit.

Figure 1:
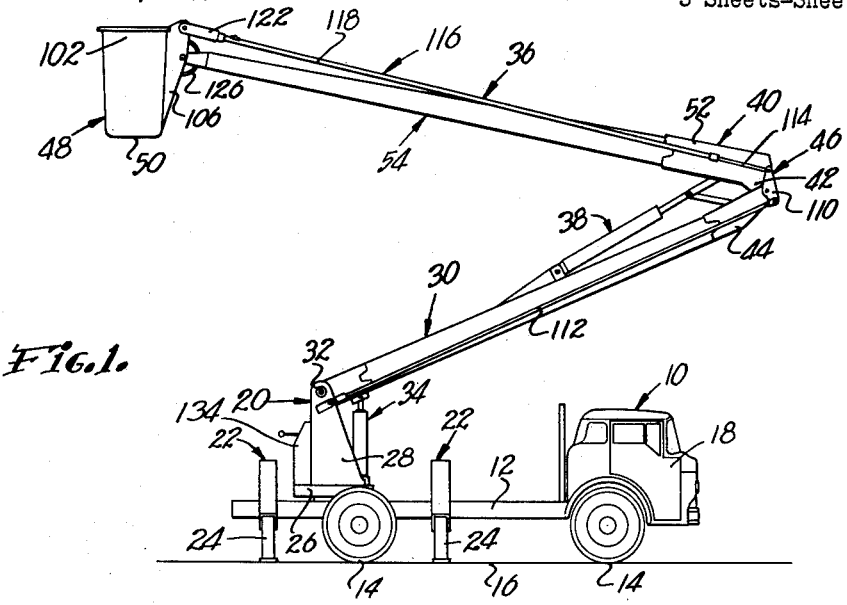
FIGURE 1 is a side elevational view of an aerial platform truck embodying the concepts of the present invention and illustrating the basket and upper boom element which are constructed of synthetic resin material.

An aerial platform truck embodying the preferred concepts of the instant invention is broadly designated by the numeral 10 in FIG. 1 and includes as basic components a frame 12 provided with wheel and axle assemblies 14 adapted to engage the ground 16, while a cab unit 18 is mounted on frame 12 at the forward end thereof and elevatable platform assembly 20 is disposed at the rear of frame 12. One or more outrigger units 22 carried by frame 12 adjacent assembly 20 each have outwardly shiftable end sections 24 movable into engagement with ground 16 to support the weight of assembly 20 and the workman carried thereby.

Assembly 20 includes a table 26 rotatable about a vertical axis and having a pair of spaced, upright supports 28 movable with table 26. Lower boom 30 swingably mounted on the upper extremities of supports 28, positioned therebetween and pivotal about the horizontal axis of pin means 32, is movable in response to piston and cylinder means 34 carried by table 26 and coupled to boom 30, as shown in FIG. 1.

A second or upper boom 36 is pivotally joined to the outer end of boom 30 for swinging movement about a second horizontal axis spaced from pin means 32. Piston and cylinder means 38 carried by boom 30 and operably coupled to sleeve 40 of boom 36, effects swinging movement of the latter in response to actuation of piston and cylinder means 38.

Sleeve 40, which is of metal as are the components of boom 30, supports 28 and table 26, has a downwardly projecting tongue portion 42 thereon which is pivotally joined to the outer extremity of a metallic sleeve unit 44 on the normal uppermost end of boom 30. As will be explained in greater detail hereinafter, assembly 20 includes leveling mechanism broadly designated 46 for maintaining basket 48 in a position with the lower wall 50 thereof parallel with the ground, regardless of the position of basket 48, it being noted that the latter is pivotally carried by the outer end of upper boom 36.

The main section 52 of sleeve 40 is of tubular configuration and preferably slightly tapered as the outer end thereof, remote from tongue portion 42, is approached. An elongated structural member generally numerated 54 is telescoped in section 52 of sleeve 40, and is constructed of materials having insulating characteristics so that workmen in basket 48 are not electrically grounded. It is also preferred that basket 48 be formed of substances which do not conduct electricity so as to offer even greater safety during utilization of truck 10 adjacent electrical transmission equipment. Although structural member 54 may be of various transverse configurations, it is to be preferred that the same be relative rectangular in cross-section and longitudinally tapered as indicated by FIG. 3.

Structural member 54 is made up of a tubular element 56 of reinforced synthetic resin material and having a filling of synthetic resin foam 58 therein, while transversely extending walls 60 and 62 close opposite ends of element 56. In order to provide additional support, a number of transversely extending, longitudinally spaced baffles 64 may be provided within element 56 and substantially conforming to the inner configuration of the latter.

The construction of structural member 54 is indicated schematically in FIGS. 7 to 10 inclusive, wherein it can be seen that an elongated, generally channel-shaped main mold 66 is provided for molding transversely U-shaped, elongated component 68 of element 56. Another, somewhat smaller, transversely U-shaped mold 70 is provided for producing an elongated, U-shaped part 72 to close the longitudinally extending opening 74 of component 68, as will be hereinafter explained.

In the manufacture of structural member 54, a film of wax is first applied to the inner surfaces 76 of molds 66 and 70 respectively to preclude adherence of the synthetic resin substance to the molds. The preferred wax is Rexco Paste #2 manufactured by the Rexco Chemical Company. After application of the paste wax, surfaces 76 of molds 66 and 70 are sprayed with a release agent such as Rexco Film #2 manufactured by the company identified above, and the release agent then permitted to cure for approximately twenty minutes. Next, the interior surfaces 76 of molds 66 and 70 are sprayed with Gelkote Glidden White #311, manufactured by the Glidden Company, and the molds then subjected to a temperature of 100° F. for one and one-half hours to cure the materials applied thereto.

One layer of Laminac 4116-0-48 Polyester Resin, manufactured and sold by American Cyanamid Chemical Corp., is sprayed onto the inner surfaces of the molds to form a relatively thin layer of the resin. One layer of ¾ ounce Ferro Fiberglass, produced and sold by Ferro Fiberglass Manufacturing Co., is applied to the outer surface of the initial layer of resin, whereupon another layer of the polyester substance is applied to the exposed face of the Fiberglass mat. A layer of one and one-half ounce Ferro Fiberglass is applied to the second coat of resin and then the materials subjected to rolling until completely air free. The above procedure is duplicated until U-shaped components designated by the numerals 68 and 72 are built up to approximately ¼ in. in thickness. The materials are then cured for approximately two hours at 100° F.

Next, at least eleven layers of 26 ounce glass fiber, unidirectional roving impregnated with polyester resin is applied to the inner surface 82 of component 68 and the inner surface 84 of part 72 to present a tension member 78 on component 68 and a compression member 80 on part 72. The substance is rolled until air free and the laminar units permitted to cure for two hours at 100° F.

Rectangular bulkheads or end walls 60 and 62 which have been prepared by molding Atlas Molding Compound #100, manufactured by The Atlas Powder Co., under a pressure of 500 p.s.i. and at a temperature of 350° F., are placed in mold 66 at the ends thereof prior to lay up of polyester resin and the described glass fiber mats therein. End walls 60 and 62 are of a size to close the corresponding ends of element 54 as shown in FIG. 3. End walls 60 and 62 are joined to respective margins of component 68 during formation of the latter, utilizing the resin employed in building up the walls of component 68.

The baffles 64 are constructed of nine layers of 2 ounce Owens-Corning Fiberglas mat treatment 219E impregnated with polyester resin, and the materials cured at 350° F. under 100 tons force. After placement of baffles 64 in component 68 in proper spatial disposition, short lengths of glass fiber mat impregnated with polyester resin are placed in the corners presented by baffles 64 and the respective walls of component 68. Upon curing of the resin, the baffles 64 are held firmly in place by the generally transversely L-shaped fasteners defined by the short lengths of glass fiber mats.

A pair of elongated, relatively thick end members 86 are constructed of nineteen layers of 2 ounce Owens-Corning Fiberglas mat and nineteen layers of 26 ounce Hess Goldsmith woven glass roving impregnated with polyester resin and cured at 350° F. under 100 tons force. Upon curing of the resin, members 86 are secured to the inner surfaces 76 of the side walls of component 68 in positions so that members 86 extend outwardly from end wall 62, as best shown in FIG. 3. It is desirable that members 86 be provided with integral boss portions 88 on the outer ends thereof, with an opening 90 being formed in boss portions 88 as well as the adjacent areas of members 86 to clear pin means, to be hereinafter described. Members 86 may be laminated to the inner faces of opposed side walls of component 68 by utilizing Epoxy Polylite #6130 manufactured by Reichold Chemical Company with the materials then being cured for two hours at 100° F.

It is also to be preferred that a number of elongated control rod tubes 92 be provided within component 68, extending the length thereof and preferably disposed in abutting relationship to the outer face of the tension member 78 forming a part of component 68. Although tubes 92 may be constructed of various kinds of synthetic resin materials, the preferred construction is utilizing a butyrate type resin. Tubes 92 are secured to the outer exposed face of tension member 78 within component 68, by placement of one layer of glass fiber matting impregnated with polyester resin over tubes 92. This construction serves the twofold purpose of maintaining the tubes in parallel alignment and also presents a protective layer for preventing the foam material subsequently introduced into component 68 from softening the resin from which tubes 92 are formed. Baffles 64 have notches 94 therein for clearing each of the tubes 92. As indicated in FIG. 3, tubes 92 extend the full length of component 68 and terminate within corresponding recesses therefor in opposed end walls 60 and 62.

The next step in production of structural member 54 involves placement of a foam lid 96 over the open end of mold 66 in closing relationship to component 68, as indicated in FIG. 9. A number of clamps 98 are employed to securely affix lid 96 to mold 66, and it is to be preferred that lid 96 have a number of gate openings 100 therein with at least one opening being provided between each pair of adjacent baffles 64, as well as between baffles 64 and proximal walls 60 and 62.

An admixture of Polylite Foam #8605 (98%), manufactured by Reichold Chemical Company, a hardener designated #8640, produced by the same company, and 1% water are added to Polylite Foam #8625, also manufactured by Reichold Chemical Company, to produce a material adapted to be introduced into element 56. In the preferred formulation, 55 parts by weight of the admixture of Polylite Foam #8605, hardener and water, is utilized for each 50 parts of Polylite Foam #8625. Sufficient foam is poured through openings 100 into the interior of component 68 to completely fill the individual compartments presented by lid 96, component 68 and baffles 64, as indicated in FIG. 10, and then the foam is permitted to cure for approximately one and one-half hours. Since the synthetic resin foam is introduced into the mold in an unpolymerized state, it can be recognized that upon curing of the foam, the same bonds with and firmly adheres to the exposed surfaces of component 68 as well as baffles 64 and end walls 60 and 62. The foam reinforces the walls of element 56 and thereby increases the structural strength of the final boom member.

Cap part 72 and the compression member 80 forming a part thereof are removed from mold 70 and placed on component 68, as illustrated in FIG. 10, after removal of lid 96 from mold 66. The outer surfaces of foam 58 and the inner opposed faces of component 68, part 72 and compression member 80 thereon are thoroughly wetted with liquid epoxy resin prior to placement of part 72 on component 68. Next four layers of epoxy impregnated, 1½ ounce glass fiber matting is laid across the upper part of component 68 and extending the full length of the latter, whereupon cap part 72 is clamped in place in covering relationship to the opening in component 68, as shown in FIG. 10. After curing of the epoxy resin, the completed structural member 54 is removed from mold 66 and trimmed.

Operator basket 48 is also formed of polyester resin impregnated with reinforcing glass fibers and includes an upright wall 102 integral with bottom wall 50 and having a rear wall portion 104 normally adjacent structural member 54. A pair of parallel, normally rearwardly extending mounting elements 106 integral with rear wall portion 104 receive boom tip members 86 therebetween with a pin 108 extending through openings 90 in members 86 and carried by elements 106 to thereby permit basket 48 to pivot about the axis of pin 108.

Figure 2:
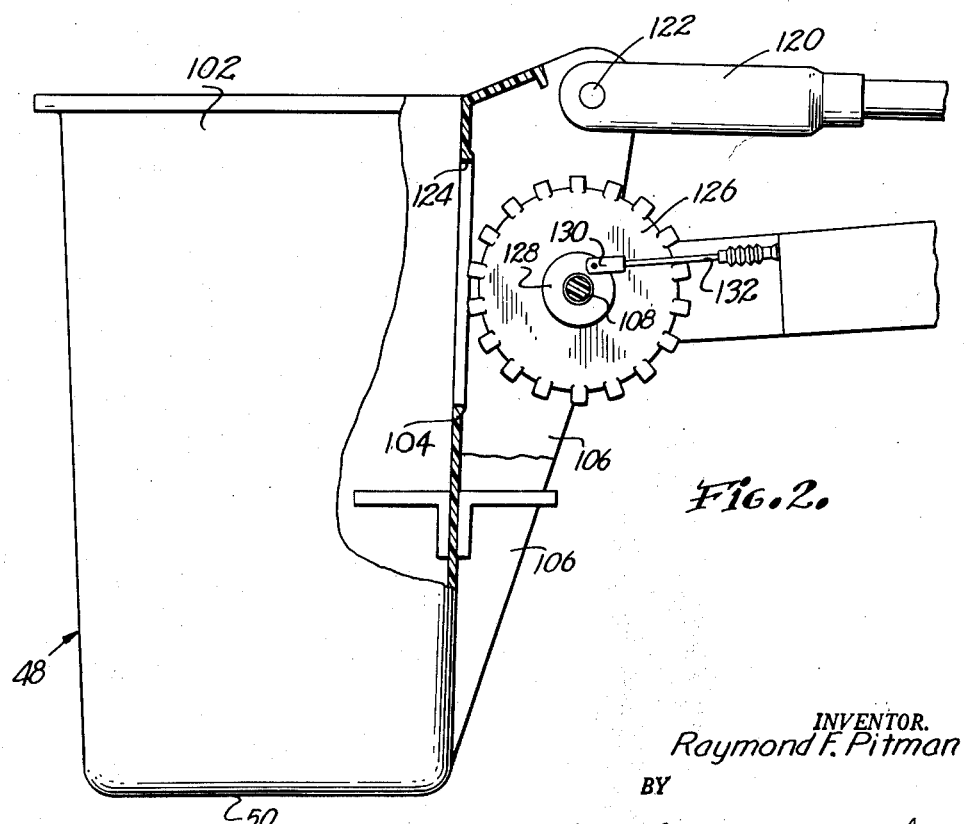
FIG. 2 is an enlarged, fragmentary, side elevational view of the operator basket and the outer extremity of the upper boom element, with certain parts of the components being broken away and in section to reveal details of construction.

In order to maintain basket 48 in a horizontal position during vertical movement thereof, leveling mechanism 46 includes a pair of links 110 mounted on opposite sides of sleeve unit 44 for rotation relative to the latter, with the lowermost ends of links 110 being joined to corresponding upright supports 28 by elongated rods 112, as shown in FIG. 1. Relatively short metallic rods 114 secured to the upper ends of corresponding links 110, pivotal relative thereto and having an outer threaded end, are adapted to be coupled to elongated, synthetic resin pipe units broadly numerated 116. Each unit 116 comprises a main pipe section 118 formed by epoxy resin having continuous strands of glass fibers embedded therein to increase the strength of the sections. The ends of sections 118 normally adjacent rods 114 are externally threaded and are complementally received in couplings secured to the proximal ends of rods 114. Polyester resin clevises 120, also having reinforcing glass fibers therein, are adhesively joined and pinned to the ends of pipe sections 118 remote from rods 114 and embrace corresponding mounting elements 106, as best shown in FIG. 2. Pins 122 extending through respective clevises 120 and the support 106 embraced thereby, secure units 116 to basket 48 in spaced relationship to pin 108.

Rear wall portion 104 of basket 48 is provided with an opening 124 therein providing access to a number of control wheels 126 rotatably mounted on pin 108 and maintained in proper spaced relationship by integral collar means on pin means 108. Each of the wheels 126 are provided with sleeve portions 128 thereon as shown in FIG. 2. One wheel 126 is provided for each of the control rod tubes 92, with rods 132 passing through respective tubes 92 being coupled to sleeve portions 128 of wheels 126 through connector means 130 arranged eccentrically of a corresponding wheel 126 with respect to the axis of pin 108. Rods 132 are of polyester resin having longitudinally extending glass fibers embedded therein, and extend from wheels 126, through tubes 92 and to a point within sleeve unit 40.

It is to be understood that steel cables are joined to respective rods 132 through connector means within unit 40 and pass to the control panel 134 of truck 10 to thereby permit the workman in basket 48 to move the disposition of the latter in response to rotation of corresponding wheels 126.

Thus, in operation of truck 10, the workman climbs into basket 48 while booms 30 and 36 are in folded positions, then proceeds to rotate certain of the wheels 126 to shift rods 132 in directions to effect actuation of either piston and cylinder means 34 or 38, as required, to raise basket 48 to a desired elevation. Another of the wheels 126 may also be rotated to cause table 26 to be rotated about the vertical axis of movement thereof.

During swinging movement of booms 30 and 36, the leveling mechanism 46 maintains basket 48 in a horizontal position regardless of the elevation thereof, and synthetic resin units 116 preclude electrical grounding of basket 48, even if sections 116 engage transmission lines or similar high voltage equipment.

An aerial platform truck constructed in accordance with the present invention has been tested with potentials of 230,000 volts A.C. between the operator's platform and the ground boom base, without flashover occurring. In addition to the exceptional protection basket 48 and structural member 54 offer against electrical hazards when workmen are performing operations in and around power lines, it has been determined that structural member 54 provides extreme stability. Swaying and flexing of the upper boom 36 is completely eliminated, yet easily movable hand wheels 126 provide the workman with immediate, positive control over movement of basket 48.

Having thus described the invention what is claimed as new and desired to be secured by Letters Patent is:

1. In an aerial platform truck having a frame, a table mounted on said frame for rotation on a vertical axis, a first boom mounted on said table for swinging movement on a horizontal axis, and a stub second boom mounted on the outer end of the first boom for rotation on a second horizontal axis, the improvement of which comprises an elongated, tubular boom element constructed of synthetic resin material, secured to and extending outwardly from said stub boom for movement therewith; a filling within said element of solidified synthetic resin foam substance; a plurality of rigid baffles in said element in transversely extending relationship thereto, said baffles substantially conforming to the internal cross-sectional configuration of the element and disposed at spaced intervals therealong, the filling being in contact with the respective baffles; and an operator basket constructed of synthetic resin material and swingably secured to the outer end of said element.

2. In an aerial platform truck as set forth in claim 1 wherein is provided mechanism on said first and second booms for maintaining the basket in a horizontal position as said booms are swung about the axes of movement thereof, the additional improvement of which comprises reinforced, elongated, rigid synthetic resin members swinably secured to said basket and adapted for connecting the basket to said mechanism.

3. In an aerial platform truck having a frame, a table mounted on said frame for rotation on a vertical axis, a first boom mounted on said table for swinging movement on a horizontal axis and a stub second boom mounted on the outer end of the first boom for rotation on a second horizontal axis, the improvement of which comprises an elongated, tubular boom element constructed of synthetic resin material, secured to and extending outwardly from said stub boom for movement therewith; a filling within said element of solidified synthetic resin foam substance; an operator basket constructed of synthetic resin material and swingably secured to the outer end of said element; and control means on the frame for effecting rotation of the table and swinging movement of said first and second booms, the additional improvement of which comprises an elongated cable for each of said control means and extending longitudinally of said element therewithin, synthetic resin guide tubes within said element, extending the length of the latter and reciprocably receiving corresponding cables, a synthetic resin control wheel for each of said cables and rotatably mounted on the basket, and means coupling said cables to respective wheels for shifting the cables in response to rotation of said wheels.

References Cited in the file of this patent

UNITED STATES PATENTS

| | | |
|---|---|---|
| 2,376,653 | Boyer | May 22, 1945 |
| 2,693,922 | Ellison | Nov. 9, 1954 |
| 2,728,702 | Simon | Dec. 27, 1955 |
| 2,802,766 | Leverenz | Aug. 13, 1957 |
| 2,805,974 | Brucker | Sept. 10, 1957 |
| 2,826,240 | Meier | Mar. 11, 1958 |
| 2,841,998 | Troche | July 8, 1958 |
| 2,862,650 | Scott | Dec. 2, 1958 |
| 2,870,793 | Bailey | Jan. 27, 1959 |
| 2,881,110 | Walker et al. | Apr. 7, 1959 |
| 2,940,539 | Richey | June 14, 1960 |
| 2,954,092 | Thornton-Trump | Sept. 27, 1960 |

FOREIGN PATENTS

| | | |
|---|---|---|
| 812,414 | Great Britain | Apr. 22, 1959 |

OTHER REFERENCES

Electrical World, page 93 of February 16, 1959.

Electrical World, volume 151, No. 26, page 133 of June 29, 1959.